United States Patent [19]
Gliemeroth et al.

[11] 3,950,591
[45] Apr. 13, 1976

[54] GLASSY OR CRYSTALLINE MATERIAL FOR PHOTOTROPIC THIN LAYERS

[75] Inventors: Georg Gliemeroth, Mainz-Mombach; Lothar Meckel, Oestrich, both of Germany

[73] Assignee: Jenaer Glaswerk Schott & Gen., Mainz, Germany

[22] Filed: Nov. 7, 1972

[21] Appl. No.: 304,439

[30] Foreign Application Priority Data
Nov. 12, 1971 Germany............................ 2156304

[52] U.S. Cl............. 428/432; 428/539; 350/160 P; 96/10 PC; 106/DIG. 6
[51] Int. Cl.².. B32B 15/00; B32B 9/04; G02B 5/23; G03C 1/52
[58] Field of Search................ 350/160 P; 252/300; 106/DIG. 6; 96/90 PC; 117/33.3; 428/432, 539

[56] References Cited
UNITED STATES PATENTS

| | | | |
|---|---|---|---|
| 3,266,370 | 8/1966 | Marks et al...................... | 96/90 PC |
| 3,561,269 | 2/1971 | Seitz................................ | 350/160 P |
| 3,655,256 | 4/1972 | Claytor et al.................... | 350/160 P |
| 3,766,080 | 10/1973 | Swinehart et al................. | 252/300 |

FOREIGN PATENTS OR APPLICATIONS
1,213,798  11/1970  United Kingdom............ 106/DIG. 6

OTHER PUBLICATIONS
Soviet Journal of Optical Techology, Perveyev et al., Feb. 1972, pp. 117–118.

*Primary Examiner*—Mary F. Kelley
*Attorney, Agent, or Firm*—Burgess, Dinklage & Sprung

[57] ABSTRACT

An article comprising a substrate forming a body portion of the article and a reversible phototropic coating thereon, the coating comprising a glassy or crystalline composition of the system $Me^{a+}$, X, $Me^{b+}$ wherein:
  $Me^{a+}$ is a photosensitive metal of valence $a^+$,
  X is an anion, and
  $Me^{b+}$ is a metal of valence $b^+$ $Me^{a+}$, X, and $Me^{b+}$ being compatible in proportion to provide said reversible phototropic coating. Typically $Me^{a+}$ is $Ag^{1+}$, $Cd^{2+}$, $Hg^{2+}$, or $Pb^{2+}$; X is a halogen anion; and $Me^{b+}$ is $Pb^{2+}$, $Zn^{2+}$, $Sn^{4+}$, $Tl^{3+}$, an alkali metal cation or an alkali earth metal cation.

25 Claims, 2 Drawing Figures

FIG. 1.

FIG. 2.

GLASSY OR CRYSTALLINE MATERIAL FOR PHOTOTROPIC THIN LAYERS

BACKGROUND

The invention concerns a material which, when applied in a thin coating to a transparent support, has phototropic properties.

Phototropic glasses and their properties have been extensively described in numerous patents. There is a recent summary of the state of the art: Gliemeroth und Mader: Angew. Chemie 9 (1970) 6, 434, International Edition in English. Such glasses contain the agents of phototropy uniformly distributed in the form of mostly glassy segregations (Bach und Gliemeroth: Glastechn. Ber. 44 (1971) 8, 305, or J. Amer. Ceram. Soc. 54 (1971) 10).

In contrast to homogeneous, phototropic, inorganic glasses of this kind, phototropic, thin inorganic coatings which can be applied in simple form to a transparent support (hereinafter called the substrate) are unknown, so far as is known to the applicant. So far as applicant is informed, there is no suitable phototropic coating material.

The most obvious courses—the use of a coaating of silver halogen—does not produce reversible phototropy: in the most favorable case it produces naught but photosensitivity, such as is known in the photographic art. The search for suitable inorganic materials for phototropic coatings has thus far led to only two practical possibilities so far as known to applicant.

From German Offenlegungsschrift 1,596,819 and British Patent 1,111,740, work has become known in which a coating of photosensitive silver halide was applied to a substrate of glass or plastic and then covered with a transparent acceptor coating. This acceptor coating serves for the capture of the halogens released upon illumination and assures their return to the photosensitive silver halide layer, thus providing for the reversibility of the phototropic process. Without the acceptor layer, the loss of the halogens by diffusion would result in a fatiguing of the phototropy (British Pat. 1,111,749, p. 2, 105 et seq.). The essential content of this work according to German Offenlegungsschrift 1,596,819 and British Pat. 1,111,740 is the combination of a coating of silver halide (wholly or partially replaceable by likewise photosensitive mercury halide or thallium halide) with an acceptor substance which in the form of a coating must cover the photosensitive layer. Experience has shown that such combination entails difficulties in manufacture, so that a simpler solution must be sought.

Another approach to the production of phototropic coatings has been taken in German auslegeshrift 1,596,764 (U.S. Pat. No. 3,419,370) by doping a halogen-containing, silver-free glass in a layer with silver, so that in this layer silver halides were formed which produced the phototropic effect. Here the blocking of the halogens which is necessary to prevent fatiguing of the reversibility, by preventing loss through diffusion, is accomplished by the surrounding glass matrix (just as in solid phototropic glasses). Silver doping is performed preferably by ion exchange (against sodium ions in the base glass). This process, however, has the disadvantage of involving a doping process and a heat treatment which cannot be performed in the framework of common coating processes.

A variety of materials have already been proposed for electrochromatic layers, e.g., in U.S. Pat. No. 3,521,941 and U.S. Pat. No. 3,512,869. In both cases photosensitive materials are sandwiched between transparent electrode layers. These known layers are especially characterized by the fact that they have an additional acceptor layer for any decomposition products that may develop upon exposure of the electrochromatic layer to light.

THE INVENTION

The object of the present invention, therefore, is to provide a physically homogeneous material which can be applied in simple form to a substrate, either of glass or plastic, and then, as a coating on this substrate, possesses phototropic properties, and which can be applied to the substrate by any desired coating process, such as, for example, by vaporization, by sputtering, or by immersion in, for example, organometallic solutions of the material followed by pyrolysis or hydrolysis of the solution as is appropriate, or by immersion in melts of the coating materials.

Another object of the invention is to provide a homogeneous material which, upon application as a coating on a substrate, will not decompose during the coating process, especially a material whose composition will not break down into fractions during vacuum vaporization under the temperature prevailing in such cases.

In attempts to achieve these objects a photosensitive material was originally used which is not reversibly phototropically. To this end a silver salt was used, as well as a mercury salt, cadmium salt or a salt from the group of the metals which display photoconductivity, for example. It was found, however, that the application of these salts alone in layer form was not capable of producing a phototropic coating, especially a reversibly phototropic coating. The coatings behaved at best like a photographic plate, i.e., they blackened when exposed to light, but the blackening could not be restored to a state of lesser extinction. Neither heating nor radiation helped to regenerate the material. Reversibility—the essential characteristic of phototropy—was not achieved.

The solution of these problems was finally achieved on the basis of the following considerations. In solid phototropic glasses silver halide-containing segregations are the agents of phototropy. If these segregation droplets could be separated, this would be a step towards the production of a material for reversible phototropic coatings.

It was surprisingly found that there are glasses, A, which in the fining process between 900° C to 1100° C segregate so greatly after two hours that a phase, B, and a phase, C, can easily be separated by liquation. The following list shows the composition of such a glass A, as well as phases B and C, in percentage by weight on an oxide basis:

|  | Starting Composition A | Phase B | Phase C |
|---|---|---|---|
| $SiO_2$ | 9.40 | 19.30 | 2.88 |
| $B_2O_3$ | 15.70 | 27.00 | 0.41 |
| $Al_2O_3$ | 10.80 | 21.80 | 0.60 |
| $TiO_2$ | 0.30 | 0.43 | 0.16 |
| $Na_2O$ | 0.10 | 0.08 | 0.13 |
| $K_2O$ | 0.10 | 0.08 | 0.11 |
| CaO | 5.50 | 11.54 | 0.88 |
| MgO | 4.30 | 14.43 | 0.20 |
| PbO | 33.50 | 3.79 | 52.93 |

-continued

| Starting Composition A | Phase B | Phase C |
|---|---|---|
| Ag$_2$O | 20.00 | 1.55 | 41.70 |

Certain differences between A on the one hand and B and C on the other are due to evaporation losses of Ag$_2$O, B$_2$O$_3$ and PbO. Nevertheless, it must be recognized that PbO and Ag$_2$O predominate in the heavier phase C. It is to be noted that, in the synthesis of composition A, the lead and the silver were introduced not as oxides but as chlorides, although this is not apparent since the composition has been stated in percentage by weight on an oxide basis. The liquated phase C was, after separation from phase B, deposited on a glass substrate by vaporization in a commercially available apparatus. It was found that a reversibly phototropic coating can thus be produced. Depending on the composition of the liquated phase C, which contains at least one photosensitive ion, the phase applied as a coating on a substrate may be glassy or crystalline.

By this process, generally heavy—e.g., 100 m$\mu$ thick——phototropic, non-transparent coatings may be produced on, for example, glassy substrates by the segregation of phases. Table 1 contains additional A glass compositions on the basis of raw materials useful for forming the batch:

Table 1

| | (% by weight) | | | | | | |
|---|---|---|---|---|---|---|---|
| | 101 | 102 | 103 | 104 | 105 | 106 | 107 | 108 |
| B$_2$O$_3$ | 50 | 60 | 50 | 40 | 10 | — | — | 40 |
| NaCl | — | — | — | — | 10 | — | — | — |
| LiCl | — | — | 20 | 30 | 10 | 5 | 25 | — |
| Pb$_3$O$_4$ | 40 | 20 | — | 10 | 30 | 45 | 25 | 20 |
| AgCl | 10 | 20 | 30 | 20 | 40 | 50 | 50 | 20 |
| SiO$_2$ | — | — | — | — | — | — | — | 20 |

In all these cases, Pb$^{++}$ and/or Ag$^+$ and Cl ions, substantially, were observed in the heavier, segregating phase. This phase, applied as a coating about 10 m$\mu$ thick on a transparent substrate, produced a reversibly phototropic coating. The other, lighter phase displayed no phototropic properties in coating form.

Making use of the above-described discoveries, systematic experiments were performed, and it was surprisingly found that the use of ternary metal-halogen systems with two metal components results in a material which is phototropic in massive form and in thin layers.

These ternary metal-halogen systems must contain at least one metal of which one of its compounds is photosensitive or photoconductive. These metals include, for example, Ag, Cd, Hg, Pb, Zn, Cu, Au, Sn, As, Ga, Ba, Ti, In, Sb, Te and Bi.

When silver is used as the photosensitive metal component the strongest effects are achieved. However, cadmium, mercury or lead are also very effective.

It has been found that ternary metal-halogen systems are especially suitable in the meaning of the invention when Cl, Br or F is contained in them as the halogen.

Figure 1:
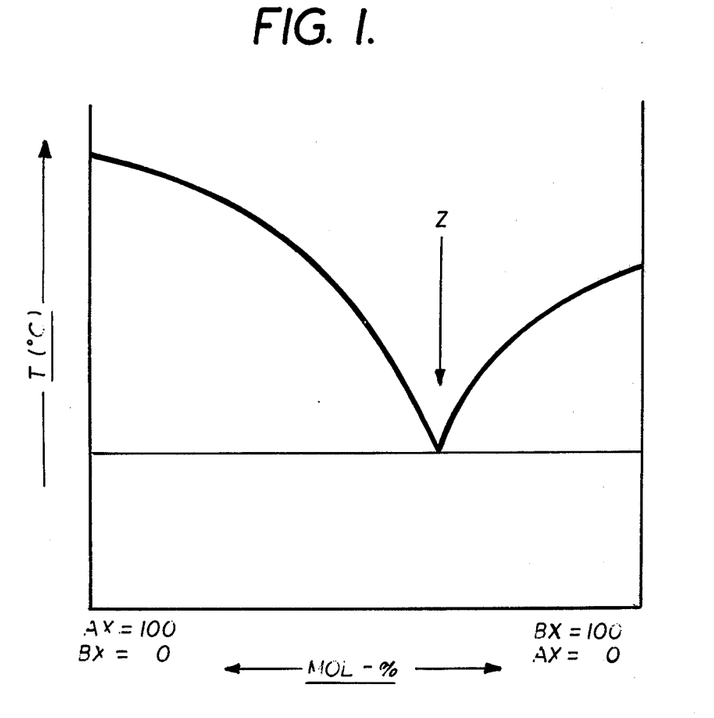

The eutectic ranges of composition of these ternary systems can be applied in coating form with especial ease by the vacuum vaporization process. These eutectic ranges can be well visualized by a binary representation of the ternary metal-halogen systems as in FIG. 1. In this graph, A represents the one metal component, B the other metal component, X the halogen component and Z the eutectic composition, T is the temperature. The eutectic composition is favorable for the vapor-coating process because it melts homogeneously without fractionation, and therefore can be deposited on the substrate in the same composition which the starting material had.

That special solidification structures can be observed upon the solidification of eutectic compositions may possibly be the reason why especially good phototropy is observed when these eutectic compositions are used as coating materials (as regards changes in extinction proportional to the incident light and as regards the kinetics of phototropy), independently of the process by which the coating was applied.

For the production of the material from which the coating is then to be produced, it is desirable to set out from binary metal halides and combine them into a ternary compound in stoichiometric ratio (i.e. eutectic ratio) by melting in the absence of oxygen. An inert gas, nitrogen, or the halogen in question may be used as shielding gas during the melting process.

The melting process itself will now be explained through the example of the ternary system Ag-K-Cl. A stoichiometric mixture of 29 mole-% KCl and 71 mole-% AgCl with a purity of DAB 6 (German Dispensatory 6) is finely ground with a mortar and pestle, melted in a platinum crucible at 500° C in a furnace flooded with chlorine gas, and quenched to room temperature 10 minutes after a homogeneous melt is achieved. The eutectic temperature is 306° C. After cooling down from the molten phase, a homogeneous, white-crystalline material is obtained. This ternary compound, consisting of the components Ag, K and Cl, is usable as a starting material for a coating process. It has been found that this material, placed in a vaporization pan of a commercially available vapor-coating system, the pan being heated sufficiently above 305° C, vaporized homogeneously and can be deposited in a thin layer on a substrate. The duration of the vapor-coating process and the temperature of the vaporization pan, plus other factors, have an influence on the thickness and texture of the coating. If this coating on the substrate is exposed to ultraviolet or short-wave visible light, it assumes a dark blue-gray color. This extinction increase, which is proportional to the number of photons impinging upon the coating, is reversible. If no more of the photons causing the discoloration impinge upon the coating, the coating regenerates to the initial state, i.e., the extinction diminishes again. The speed of this regeneration process is temperature-dependent. The higher the temperature is, the faster is the regeneration. In the case of the Ag-K-Cl coating, the regeneration half-time depends on the temperature as follows:

| | Regeneration half-time |
|---|---|
| 10°C | Less than 16 h |
| 20°C | Approx. 4 h |
| 50°C | Approx. 40 min |
| 100°C | Approx. 15 min |

These values are also affected, not only by the intensity of the preceding exposure and of the extinction difference created thereby but also, and to a great extent, by the texture and structure of the coating; the phototropic characteristics of the coating are thus dependent upon the method whereby the coating was produced.

It has been found that, although the texture of the coating depends substantially on the conditions under which the coating was produced, it also depends to a great extent on the components used for the ternary compound.

A ternary compound in the Pb-Ag-Cl system was mixed in such a manner that it contained stoichiometrically 58 mole-% $PbCl_2$ and 42 mole-% AgCl. This material was vapor-coated onto a styrene substrate by a method corresponding to the preceding example. A reversibly phototropic coating 10 m$\mu$ thick was thus produced. This coating was tested by the X-ray fluorescence method (RFA), and the elements Ag, Pb and Cl were found in the approximate concentration ratio of 1 : 1.4 : 6.3 (in parts by weight). An X-ray diffraction photograph made of the same coating showed only slightly disarrayed lead chloride as a crystalline phase in the coating. This finding cannot as yet be clearly explained, but the ion radius of $Ag^+$ is 12% smaller than that of $Pb^{++}$, so that there is certainly room in a disarrayed $PbCl_2$ lattice for the $Ag^+$. On the other hand, the imperfection in the $PbCl_2$ lattice might also find its explanation in the process whereby the coating was produced.

Examination of a coating made of the ternary system Pb-Ag-Br by the same procedure, by means of X-ray diffraction showed crystalline lead bromide and small amounts of silver bromide. Since pure silver halides alone do not permit the making of reversibly phototropic coatings, great importance must be ascribed to the presence of a second metal component which forms a lattice together with the halogen that is used.

It has been found that, in the simplest case, a material from which a reversibly phototropic coating can be made by a coating process of the prior art must consist of an $Me^{n+}$ type of ion, a type of anion, and a photosensitive $Me^{(n-1)+}$ type of ion, $n$ having a value of 1, 2 or 3. In special cases an $Me^{n+}$ ion may be used as the photosensitive type of ion.

From numerous X-ray diffraction tests it can be concluded that a host lattice is formed mainly from the non-photosensitive $Me^{n+}$ and the anions, and the photosensitive ion is incorporated into that lattice in the case of an insufficiency. In the case of an excess of photosensitive ions the lattice type is apparently formed additionally from photosensitive ions and anions. This unconfirmed hypothesis is supported by the findings from X-ray diffraction analysis set forth in Table 3. Accordingly, the lattice of the non-photosensitive Me ions with the anion always occurs, if any lattice at all can be observed through X-ray diffraction, but the lattice of the photosensitive Me ions with the anions occurs only when there is a high content of photosensitive metal ions in the overall composition of the coating. The components found by X-ray fluorescence analysis in the coating are also listed in Table 3.

Figure 2:
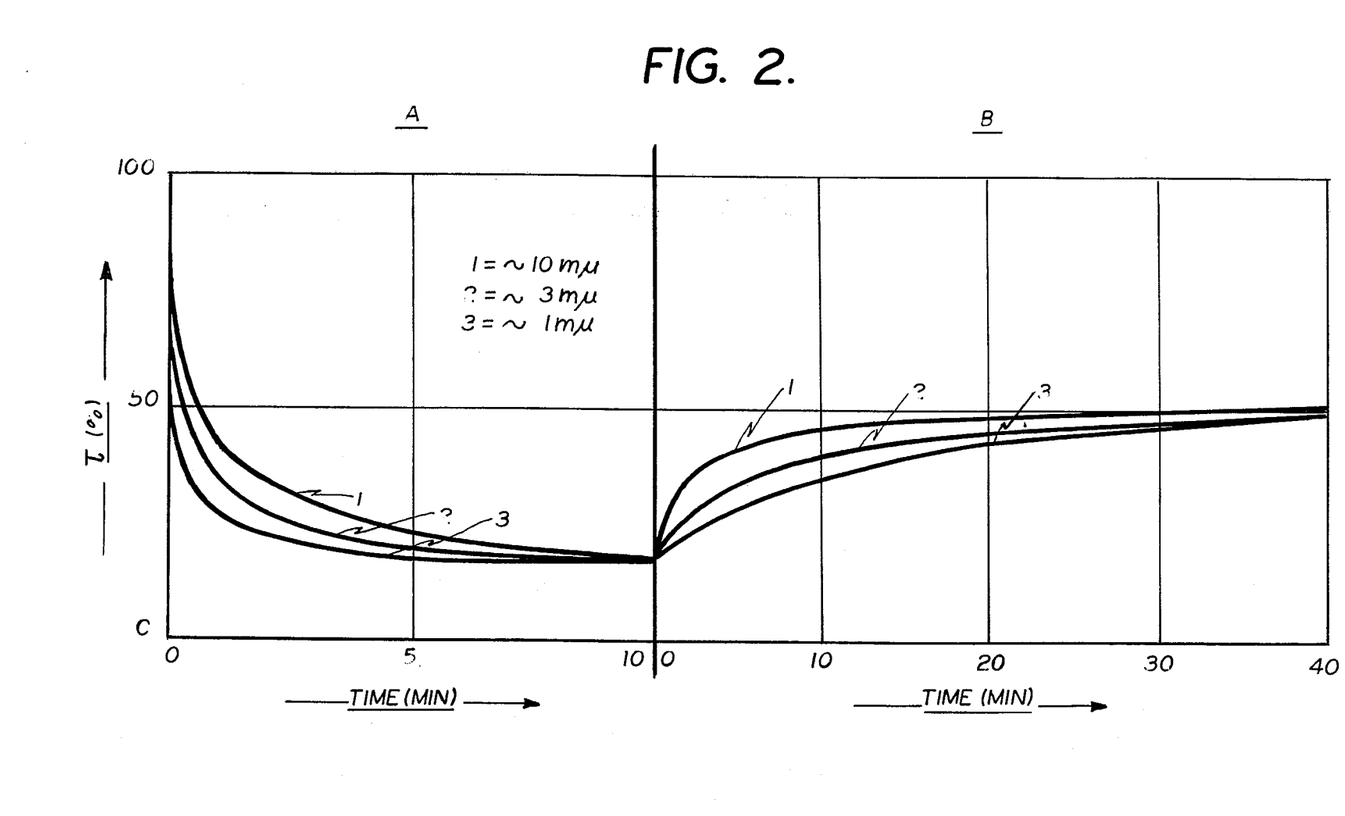

The effect of coating thickness on the phototropy, that is, on the extinction change which can be achieved upon exposure to light and on regeneration after termination of such exposure, is shown in FIG. 2 for a material of the Ag-Mg-Cl system. Part A of this figure shows the extinction change upon exposure to light at 20° C. The permeability to light is plotted in percent against the time in minutes. If the thickness of the phototropic coating is different, approximately the same ultimate extinction is achieved, although the rate of change of extinction is different. Part B shows the regeneration to the initial state after termination of the exposure to light, at 50° C. The thickest coating, in contrast to the exposure process, shows the lowest rate of recovery. It appears to be a question substantially of texture differences. It has been found that sufficiently translucent or transparent coatings can be produced when the coating thickness is less than 10 m$\mu$. In cases in which the coating is excessively opaque and normal transmission measurement becomes difficult, the phototropy can be measured especially well by reflection. To this end a beam of light in the wavelength maximum of the extinction change of the phototropy which is not in the range of the wavelength maximum of the excitation light of phototropy, is directed against the coating. The light reflected from the coating is measured by means of a photomultiplier through a filter system, in relation to the time during the excitation process (extinction increase) and the bleaching process (extinction decrease).

It has furthermore been found that the use of two halogen components, that is, a changeover to the quaternary system: photosensitive metal component A - metal component B - halogen X - halogen Y, is possible in some cases, although it does not appear to be always desirable. Only in cases in which it is known that the halogen ion X in the metal component B - halogen ion X lattice is at least partially replaceable by the halogen ion Y, has approximately equally good phototropy been achieved with the use of two different halogen ions.

The following ternary systems are listed as examples of the invention which do not restrict it, because the number of photosensitive metal components is appreciably greater and because the possibilities of combinations with an additional metal component and halogens, and with additional components commonly used in the production of thin, inorganic coatings, are considerably more numerous. Compositions are reported in Table 2, and properties of the compositions are reported in Table 3.

Table 2

| No. | Ternary System A B C | Concentration of the Components | | | | | | Eutectic melting temp. Position in AX-BX system | in °C |
|---|---|---|---|---|---|---|---|---|---|
| | | Photosensitive Metal A | | Lattice determining metal B | | Halogen X | | | |
| | | Mol-% | Wt-% | Mol-% | Wt-% | Mol-% | Wt-% | | |
| 1 | Ag-Pb-Cl | 43.65 | 38.98 | 31.29 | 53.67 | 25.06 | 7.35 | Eutectic point | 310 |
| 2 | Ag-Pb-Cl | 63.92 | 68.25 | 11.23 | 23.03 | 24.85 | 8.72 | Phase segregation AgCl | 400 |
| 3 | Ag-Mg-Cl | 49.22 | 75.72 | 8.83 | 3.07 | 41.95 | 21.21 | Phase segreg. MgCl | 570 |
| 4 | Ag-Mg-Cl | 64.47 | 85.09 | 3.66 | 1.09 | 31.86 | 13.83 | Eutectic point | 470 |
| 5 | Ag-Mg-Cl | 69.73 | 87.73 | 1.87 | 0.52 | 28.39 | 11.74 | Phase segreg. AgCl | 480 |
| 6 | Ag-Mg-Cl | 30.04 | 58.39 | 15.34 | 6.72 | 54.62 | 34.89 | Phase segreg. MgCl | 610 |
| 7 | Ag-Rb-Cl | 45.16 | 59.19 | 28.27 | 29.36 | 26.37 | 11.45 | Eutectic point | 270 |
| 8 | Ag-K-Cl | 53.43 | 77.16 | 15.21 | 7.97 | 31.35 | 14.87 | Eutectic point | 305 |
| 9 | Ag-K-Cl | 41.26 | 67.25 | 23.69 | 13.99 | 35.04 | 12.76 | Phase segreg. KCl | 600 |

Table 2-continued

| No. | Ternary System A B C | Photosensitive Metal A Mol-% | Photosensitive Metal A Wt-% | Lattice determining metal B Mol-% | Lattice determining metal B Wt-% | Halogen X Mol-% | Halogen X Wt-% | Position in AX-BX system | Eutectic melting temp. in °C |
|---|---|---|---|---|---|---|---|---|---|
| 10 | Ag-Na-Cl | 45.16 | 73.58 | 15.73 | 5.47 | 39.11 | 20.95 | Formation of solid solution | 610 |
| 11 | Ag-Tl-Cl | 37.63 | 30.14 | 42.61 | 64.66 | 19.76 | 5.20 | Phase segreg. $Ag_3Tl_3Cl_2$ | 240 |
| 12 | Ag-Tl-Cl | 45.16 | 38.74 | 34.09 | 55.41 | 20.75 | 5.85 | Eutectic point | 210 |
| 13 | Ag-Tl-Cl | 51.93 | 47.60 | 26.42 | 45.87 | 21.65 | 6.53 | Phase segreg. AgCl | 290 |
| 14 | Ag-K-Br | 39.09 | 48.68 | 10.51 | 4.75 | 50.43 | 46.57 | Eutectic point | 285 |
| 15 | Ag-K-Br | 18.38 | 26.11 | 22.34 | 11.51 | 59.28 | 62.32 | Phase segreg. KBr | 602 |
| 16 | Ag-Li-Br | 33.89 | 42.02 | 3.28 | 0.26 | 62.83 | 57.71 | Formation of solid solution | 448 |
| 17 | Ag-Li-Br | 23.55 | 30.58 | 4.71 | 0.40 | 71.74 | 69.02 | Formation of solid solution | 476 |
| 18 | Ag-Pb-Br | 31.02 | 27.51 | 25.97 | 44.24 | 43.01 | 28.26 | Eutectic point | 276 |
| 19 | Ag-Pb-F | 36.56 | 27.75 | 48.17 | 70.21 | 15.27 | 2.04 | Eutectic point (?) | 344 |
| 20 | Ag-Zn-F | 36.56 | 57.82 | 36.05 | 34.56 | 27.39 | 7.62 | Eutectic point 1 | 630 |
| 21 | Ag-Zn-F | 72.12 | 89.53 | 8.85 | 6.57 | 18.03 | 3.89 | Eutectic point 2 | 380 |
| 22 | Ag-Li-Cl | 30.73 | 60.34 | 9.69 | 1.22 | 59.58 | 35.44 | Formation of solid solution | 533 |
| 23 | Cd-Zn-Br | 8.56 | 12.18 | 23.01 | 13.96 | 68.43 | 68.92 | Eutectic point | 364 |
| 24 | Cd-K-Br | 23.12 | 31.88 | 14.46 | 6.93 | 62.42 | 61.19 | Eutectic point 1 | 345 |
| 25 | Cd-K-Br | 15.69 | 23.00 | 20.37 | 10.39 | 63.94 | 66.61 | Eutectic point 2 | 305 |
| 26 | Cd-Pb-Br | 9.43 | 7.66 | 43.57 | 65.21 | 47.00 | 27.13 | Eutectic point | 344 |
| 27 | Hg-K-Cl | 50.24 | 84.67 | 16.78 | 5.51 | 32.98 | 9.82 | Eutectic point | 182 |
| 28 | Cd-Sn-Cl | 5.52 | 7.12 | 56.97 | 77.62 | 37.51 | 15.97 | Eutectic point | 235 |
| 29 | Cd-K-Cl | 41.08 | 68.21 | 17.31 | 10.00 | 41.61 | 21.79 | Eutectic point 1 | 320 |
| 30 | Cd-K-Cl | 22.69 | 47.12 | 33.04 | 23.87 | 44.27 | 29.01 | Eutectic point 2 | 390 |
| 31 | Cd-Pb-Cl | 22.07 | 18.47 | 47.68 | 73.55 | 30.25 | 7.98 | Eutectic point | 327 |
| 32 | Pb-Mg-Cl | 57.81 | 89.32 | 5.72 | 1.04 | 36.47 | 9.64 | Eutectic point | 455 |

Table 3

| No. | Vapor coating time in the pan [sec × 10²] | Coating thickness in µm | Elements found by X-ray fluorescence | Crystalline phases detected by X-ray fluorescence | Transmittance difference, exposed, unexposed | Regeneration speed, represented by the regeneration half-value time | Remarks |
|---|---|---|---|---|---|---|---|
| 1 | 400 | 9 | Pb, Ag, Cl | $PbCl_2$ | 31.0% | 10 min | |
| 2 | 400 | 10 | Pb, Ag, Cl | Pbcl, very weak AgCl | 26.0% | 30 min | |
| 3 | 700 | 9 | Ag, Mg, Cl | $MgCl_2$ | 19.0% | 5 min | |
| 4 | 520 | 11 | Ag, Mg, Cl | AgCl, $MgCl_2$ | 24.0% | 300 min | |
| 5 | 550 | 10 | Ag, Mg, Cl | Unknown lattice | 31.0% | 15 min | |
| 6 | 700 | 9 | Ag, Mg, Cl | $MgCl_2$ | 20.0% | 1 min | |
| 7 | 350 | 10 | Ag, Rb, Cl | RbCl, weak $MgCl_2$ | 12.0% | | coarsely crystalline |
| 8 | 400 | 12 | Ag, K, Cl | KCl | 35.0% | 480 min | |
| 9 | 700 | 11 | Ag, K, Cl | KCl, weak AgCl | 24.0% | 18 min | |
| 10 | 700 | 10 | Ag, Na, Cl | unknown lattice | 22.0% | 2 min | |
| 11 | 350 | 9 | Ag, Tl, Cl | unknown lattice | 11.0% | 6 min | |
| 12 | 350 | 9 | Ag, Tl, Cl | unknown lattice | 15.0% | | |
| 13 | 400 | 11 | Ag, Tl, Cl | similar to AgCl | 28.0% | | |
| 14 | 400 | 12 | Ag, K, Br | KBr | 32.0% | 210 min/15 min | hygroscopic |
| 15 | 700 | 10 | Ag, K, Br | KBr | 110.% | 80 min/17 min | hygrosc. |
| 16 | 550 | 10 | Ag, Li, Br | unknown lattice | 12.0% | 70 min/20 min | hygrosc. |
| 17 | 580 | 11 | Ag, Li, Br | Unknown lattice | 10.0% | 25 min | hygrosc. |
| 18 | 350 | 12 | Ag, Pb, Br | PbBr, weak AgBr | 35.0% | 27 min | coarsely crystalline |
| 19 | 450 | 11 | Ag, Pb, F | $PbF_2$ | 32.0% | 5 min | |
| 20 | 700 | 9 | Ag, Pb, F | AgF + unknown lattice | 8.0% | 8 min | |
| 21 | 450 | 10 | Ag, Zn, F | unknown lattice | 7.0% | 21 min | |
| 22 | 700 | 11 | Ag, Li, Cl | unknown lattice | 6.0% | 600 min/15 min | hygroscopic |
| 23 | 450 | 10 | Cd, Zn, Br | unknown lattice | 6.0% | | |
| 24 | 450 | 12 | Cd, K, Br | KBr | 6.0% | 12 min | |
| 25 | 390 | 7 | Cd, K, Br | KBr | 6.0% | 15 min | |
| 26 | 450 | 10 | Pb, Cd, Br | unknown lattice | 11.0% | 2 min | Coarsely crystalline |
| 27 | 350 | 8 | K, Hg, Cl | unknown lattice | 7.0% | 27 min (?) | Poor coating |
| 28 | 350 | 9 | Cd, Sn, Cl | unknown lattice | 8.0% | 10 min | |
| 29 | 450 | 10 | Cd, K, Cl | KCl + unknown lattice | 8.0% | | |
| 30 | 450 | 11 | Cd, K, Cl | KCl | 6.0% | 1.5 min | |
| 31 | 450 | 12 | Pb, Cd, Cl | $PbCl_2$ | 8.0% | 1 min | |
| 32 | 550 | 9 | Mg, Pb, Cl | $MgCl_2 + PbCl_2$ | 6.0% | 150 min | |

It has been found that a number of the coatings applied to a substrate are hygroscopic. For example, in the Ag-Li-Cl system naught but hygroscopic materials were found, and the coatings produced from this material were also hygroscopic.

This disadvantage of some of the coatings can be eliminated by stabilization, e.g., by the addition of metal ions from the group Si, B, P, Ge, Al, Zr, Zn and Sn the alkali earth metals (Ca, Sr, Ba and Mg) and the rare earths, these stabilizers being used preferably in a quantity of no more than 20 Wt-%, or by the addition of oxygen as an anion in a quantity of again no more than 20 wt-%.

The use of the stabilization agents is possible in all of the systems of this invention. It appears to be necessary, however, mainly in those systems whose materials produce hygroscopic coatings. An Example of a system that is preferably stabilized is the above-mentioned Ag-Li-Cl system, the materials produced in this system, and the coatings prepared from these materials (cf. Table 4, infra).

The hygroscopicity of coatings of the system Ag, Li, Pb, Cl are described in Table 4. The hygroscopicity could be greatly diminished by the methods of stabilization indicated in Table 5, which complements Table 4. It has been found that, after stabilization by metal ions of the group Si, B, P, Ge, Al, Zr, Zn, Sn, the alkali earth metals and the rare earths, and by oxygen, it is possible to achieve a substantial reduction of hygroscopicity while retaining uniformly good phototropic characteristics. In some cases even an improvement of the phototropy was observed.

could be found in the stabilized coating by means of X-ray diffraction photography. The disarray of these coatings was made so great by the stabilization that these coatings must be considered glassy.

The phototropic coatings of the present invention may also be sandwiched between electrode layers. By the application of a reversible direct-current field to these electrodes the phototropic effect can be intensified or diminished.

The following examples will explain the invention. In these examples the materials of the invention are applied to the substrate by vaporization. Any other coating process, however, is applicable, such as sputtering, immersion in, for example, organometallic solutions, deposition from the gaseous phase, and even immersion in the molten material. By the method of vaporization we got transparent or translucent coatings. In all most all examples a higher evacuation gets more transparent coatings. The technic of producing the coating does not change, if there are used more than two metal ions or more than one anion.

TABLE 4

| Specimen No. | Percentage parts of the metals in atoms per 100 not including halogen | | | Halogen component | Vapor coating pressure in Torr $\cdot 10^2$ | Current intensity in the pan (Amps) | Extinction increase upon exposure | Reversibility | Hygroscopicity | Coating thickness [um] |
|---|---|---|---|---|---|---|---|---|---|---|
| | Ag | Li | Pb | | | | | | | |
| 2620/I | 35 | 50 | 15 | Cl | 5 | 110 | moderate | slow | great | 20 |
| 2621/I | 35 | 30 | 35 | Cl | 4 | 120 | very slight | moderate | great | 11 |
| 2622/I | 50 | 25 | 25 | Cl | 1 | 100 | very good | moderate | moderate | 18 |
| 2623/I | 50 | 20 | 30 | Cl | 5 | 120 | slight | slow | great | 11 |
| 2641/I | 50 | 15 | 35 | Cl | 5 | 110 | slight | moderate | low | 12 |
| 2643/I | 50 | 10 | 40 | Cl | 5 | 120 | moderate | good | low | 12 |

TABLE 5

| Specimen No. | Proportion of metal ions of Type I in atoms per 100 | | | Stabilizing metal ions in atoms per 100 | Halogen component in atoms per 100 | Additional anion in atoms per 100 |
|---|---|---|---|---|---|---|
| | Ag. | Li | Pb | | | |
| 2620/II | 21.2 | 6.6 | 9.0 | Si; 5.6; Mg; 7.3; | Cl; 42.2 | O; 8.0 |
| 2621/II | 24.2 | 4.5 | 24.0 | Al; 4.0; La; 3.9; Sn; 0.9; | Cl; 35.1 | O; 3.3 |
| 2622/II | 33.6 | 3.6 | 16.6 | Si; 4.2; B: 1.4; Ba; 3,2; | Cl; 32.6 | O; 4.8 |
| 2623/II | 34.9 | 3.0 | 20.7 | B; 1.4; P; 0.8; Al; 1.2; Zr; 3.4 | Cl; 30.5 | O; 3.9 |
| 2641/II | 36.2 | 2.4 | 25.1 | Al; 2.5; Ce; 3.1; Eu; 0.05 | Cl; 28.3 | O; 1.9 |
| 2643/II | 33.4 | 1.5 | 26.5 | Si; 4.1; Ce; 6.2; La; 1.5; | Cl; 22.9 | O; 3.8 |
| 2621/III | 20.7 | 3.9 | 20.5 | Si; 14.7; Al; 1.0; | Cl; 30.0 | O; 9.0 |
| 2623/III | 30.8 | 3.8 | 18.3 | Al; 6.1; Ce; 2.7; La; 2.8; B; 3.8 | Cl; 13.2 | O; 18.6 |
| 2643/III | 26.1 | 1.1 | 20.7 | Ce; 0.2; Mg; 16.7; Sn; 5.5; | Cl; 17.9 | O; 11.8 |

| Specimen | Extinction increase on exposure to light | Reversibility | Hygroscopicity | Coating Thickness | Crystal lattice observed by X-ray diffraction |
|---|---|---|---|---|---|
| 2620/II | Moderate | good | none | 15 | non-identifiable, greatly disarrayed lattice |
| 2621/II | Moderate | slight | moderate | 17 | — |
| 2622/II | very good | slight | none | 10 | — |
| 2623/II | good | good | slight | 20 | — |
| 2641/II | moderate | moderate | very slight | 12 | faint PbCl lattice |
| 2643/II | moderate | good | none | 10 | non-identifiable, greatly disarrayed lattice |
| 2621/III | good | good | none | 15 | — |
| 2623/III | moderate | good | none | 17 | — |
| 2643/III | good | moderate | none | 12 | — |

It has furthermore been found that an important influence upon the degree of crystallinity of the coating is exercised through the stabilization of materials from which phototropic coatings can be prepared. It was observed that in some cases no crystalline structures

EXAMPLE 1

44 g of AgCl and 56 g of KCl were thoroughly mixed and placed in a platinum crucible, and the mixture was melted in an electric chamber oven at 450° C. During the melting process, nitrogen gas in an amount of 0.05 l/min. introducted into the oven to prevent oxidation of the material.

The melt was then poured into a mold and allowed to cool under a nitrogen gas atmosphere. The homogeneous solid phase formed upon said cooling darkened upon exposure to ultraviolet light or shortwave visible light.

The product was crushed in a porcelain mortar to a grain size of 50 to 100 m$\mu$, and about 1 gram thereof was placed on the evaporation pan of a commercially available vacuum vapor-coating apparatus BALZERS 502. The substrate which was normal window sheet glass, was placed about 12 cm above the vaporization pan, on a stationary or rotatable frame. Then the apparatus was evacuated down to $5 \cdot 10^{-3}$ Torr. Then, 15 min. after reaching $5 \times 10^{-3}$ Torr, at about 80 volts and 70 amps, the molten material was vaporized for about 10–15 seconds. Then, 2 min. after vaporization, the pot was slowly flooded and the vapor-coated substrate was removed.

On the surface of the substrate a transparent coating about 5 m$\mu$ thick had been deposited, which exhibited a Tyndall effect. One half of the vapor-coated substrate was masked, and the other half was then exposed to short pulses of ultraviolet or shortwave visible light and tested for phototropic qualities. After the exposure, which produces a clearly visible extinction increase in the coating of about 0.5 db, regeneration was studied. The extinction diminished with a half-value time of about 30 minutes. The specimen was left in darkness overnight, and thereby it achieved the extinction value which it had prior to exposure to light. During the exposure to light and during the regeneration the temperature was 20°C. During vaporization temperature of the substrate was about 60°C. Temperature of the crushed melt placed on the evaporation pan got about estimated 750°C. Measurement of this temperature was not possible with this simple apparatus.

EXAMPLE 2

74.5 g of AgCl and 25.5 g of PbCl$_2$ were mixed, melted, and cooled as described in Example 1; then a vapor coating was formed on styrene, by the procedure of Example of 1 deposition time was 4 sec., and tested for phototropy. Upon exposure to xenon light this translucent coating underwent a 25% loss of transmittance; regeneration took place at 35°C. with a half-value time of 60 min. When the temperature was increased the half-value time was reduced. The evacuation before vaporization was $5 \times 10^{-3}$ Torr.

EXAMPLE 3

10 g of AgCl and 90 g of MgCl (93.1 mole-% MgCl$_2$, 6.9 mole-% AgCl) were melted in closed carbon induction system at 1800°C and cooled as described in Example 1, but under an air atmosphere. A homogeneous phase formed, which immediately showed photograpic properties. The substance was deposited from a vapor with deposition time of 6 sec. as described in Example 1 but at 1500°C in evaporation pan and tested for phototropic qualities. The clear transparent coating displayed good phototropy and at the same time had good transparency. The small pan was heated during vaporization with 42 KW. The evacuation was $1 \times 10^{-4}$ Torr.

EXAMPLE 4

30.3 g of AgBr and 69.7 g of PbBr$_2$ (46 mole-% AgBr and 54 mole-% PbBr$_2$) were melted in an electric chamber oven, into which Br-gas in an amount of 0.1 ml/min. was introduced and cooled as described in Example 1, and a vapor coating was formed as described in Example 1 and tested for phototropy. The thin transparent coating had good phototropic properties (loss of transmittance: 45% upon exposure to light; regeneration with a half-value time of 27 minutes at 20°C).

EXAMPLE 5

63.15 g (32.0 mole-%) HgCl and 36.85 g (68 mole-%) KCl were melted in reduced atmosphere and cooled as described under Example 1, but in a current of chlorine gas. The fused composition was on an inorganic opthalmic lens with deposition time of 5 sec deposited as described in Example 1 from a vapor and tested for phototropic qualities. It was found that this translucent coating also had reversible phototropic characteristics.

EXAMPLE 6

54.0 of Cd cl$_2$ (64.0 mole-%) and 46.0 g of Pb Cl$_2$ (36.0 mole-%) were melted as described under Example 3 at 400°C, and a vapor coating was formed on an organic opthalmic lens with deposition time 4 sec. at 35 KW as described in Example 1. The testing of the Cd-Pb-Cl$_2$ type also showed reversible phototropic properties. The evacuation before vaporization was $5 \times 10^{-5}$ Torr.

EXAMPLE 7

82.0 g of CdBr$_2$ (86 mole-%) and 18.0 g of PbBr$_2$ (14 mole-%) were melted at 350°, as described under Example 1, but in a Br$_2$ atmosphere, and deposited from a vapor as described in Example 1. Testing for phototropy showed a loss of transmittance of 20% upon exposure to xenon light (21°C, from a 150-watt source at 20 cm); this reduction of transmittance reverted to the initial transmittance in 2 minutes after the xenon light was turned off.

The procedure of Example 1, with a wattage suitable to give a comparable evaporation rate, can be employed in production of the coatings which are the subject of Tables 2–4.

SUMMARY

Thus the invention provides an article comprising a substrate forming the body of the article and a reversible phototropic coating thereon. The coating comprises an inorganic glassy or crystalline composition of the system $Me^{a+}$, X, $Me^{b+}$ wherein $Me^{a+}$ is a photosensitive metal of valence $a^+$, X is an anion, and $Me^{b+}$ is a metal of valence $b^+$, $Me^{a+}$, X, and $Me^{b+}$ being compatible and in proportion to provide said reversible phototropic coating.

The value, $a$, can be 1–6; $b$, 1–4; and X can be halogen. Preferably $a$ is 1 or 2 and $b$ is 1–4; and X is chloro, fluoro, or bromo. Also preferable, $b$ is 1 or 2; or $a=b=1$. Also, $a$ can equal $b$.

Desirably, $Me^{b+}$ is of the elements Pb, Zn, Sn, Tl, the alkali metal cations, and alkali earth metal cations (cations of Ca, Sr, Ba, Mg).

In the coating, the mentioned components in general comprise an ionic system, with $Me^{a+}$ being a photosensitive ion or functioning photosensitively in the system, and $Me^{b+}$ being a non-photosensitive ion or functioning non-photosensitively in the system, while $Me^{b+}$ is the lattice determining metal.

With reference to the notation $Me^{a+}$, X, $Me^{b+}$, and the notation A, B, C in Table 2, $Me^{a+}$ corresponds to A; X corresponds to C and $Me^{b+}$ corresponds to B.

In the formula given above, $Me^{n+}$, anion, $Me^{(n-1)+}$, preferably $n$ is 2; and also preferably the anion is halogen, especially chloro, fluoro, or bromo.

The substrate can be translucent or transparent, the coating can be translucent or transparent. The substrate can be glass or synthetic plastic, either thermoplastic and thermoset. Desirable both the substrate, glass or plastic, and the coating, are transparent.

The invention particularly contemplates articles provided with the coatings free of an acceptor coating (cf. discussion of such coatings under Background, supra).

What is claimed is:

1. A transparent article comprising a transparent substrate forming a body portion of the article and a transparent reversible phototropic coating thereon, the coating comprising a glassy or crystallline ternary composition of the system $Me^{a+}$, X, $Me^{b+}$, $Me^{a+}$, X, and $Me^{b+}$ being compatible and in proportion to provide said reversible phototropic coating wherein:

$Me^{a+}$ is of the elements Ag, Pb, Cd, Hg, Zn, In, Ti, Ga, Sn, Sb, Ba, Bi, Au, Te, and As, X is a halogen anion, and, $Me^{b+}$ is of the elements Pb, Zn, Sn, $Tl^{+3}$, the alkali metals and alkali earth metals.

2. Article according to claim 1, wherein $b$ is 1 or 2.

3. Article according to claim 1, wherein $a=b-1$.

4. Article according to claim 1, wherein $Me^{a+}$ is $Ag^{1+}$, $Cd^{2+}$, $Hg^{2+}$, or $Pb^{2+}$; $Me^{b+}$ is $K^{1+}$, $Pb^{2+}$, $Mg^{2+}$, $Rb^{1+}$, $Na^{1+}$, $Tl^{3+}$, $Li^{1+}$, $Zn^{2+}$ or $Sn^{4+}$, and X is chloro, fluoro, or bromo.

5. Article according to claim 4, wherein $Me^{a+}$ is $Ag^{+1}$.

6. Article according to claim 4, said components of said system being in the proportion of a eutectic composition of a compound of $Me^{a+}$ and X and a compound of $Me^{b+}$ and X.

7. Article according to claim 6, the substrate being a glass.

8. Article according to claim 6, the substrate being a synthetic plastic.

9. Article according to claim 1, wherein $Me^{a+}$ is $Ag^{1+}$, $Hg^{2+}$, or $Cd^{2+}$; X is chloro or bromo; and $Me^{b+}$ is $K^{1+}$, $Pb^{2+}$, $Mg^{2+}$.

10. Article according to claim 1, said components of said system being in the proportion of a eutectic composition of a compound of $Me^{a+}$ and X and a compound of $Me^{b+}$ and X.

11. Article according to claim 1, wherein X is halogen.

12. Article according to claim 1, wherein X is chloro, fluoro, or bromo.

13. Article according to claim 1, wherein $9+=b+$.

14. Article according to claim 1, the coating being stabilized against becoming hygroscopic by Si, B, P, Ge, Al, Sn, Zr, Zn, alkali earth metals, rare earths or oxygen.

15. Article according to claim 1, the substrate being a glass.

16. Article according to claim 1, the substrate being a synthetic plastic.

17. Article according to claim 1, said article being without an acceptor coating for photosensitive ions of the coating.

18. A transparent article comprising a transparent substance forming a body portion of the article and a transparent reversible phototropic coating thereon, the coating comprising a glassy or crystalline ternary composition of the system $Me^{a+}$, X, $Me^{b+}$, $Me^{a+}$, X, and $Me^{b+}$ being compatible and in proportion to provide said reversible phototropic coating, wherein:

$Me^{a+}$ is of the elements Ag, Pb, Cd, Zn, In, Ti, Ga, Sn, Sb, Ba, Bi, Au, Te, and As, X is a halogen anion, and, $Me^{b+}$ is of the elements Pb, Zn, Sn, $Tl^{+3}$, the alkali metals and alkali earth metals.

19. Article according to claim 18, wherein $b$ is 1 or 2.

20. Article according to claim 18, wherein $a=b-1$.

21. Article according to claim 18, wherein $Me^{a+}$ is $Ag^{1+}$, $Cd^{2+}$, $Hg^{2+}$, or $Pb^{2+}$; $Me^{b+}$ is $K^{1+}$, $Pb^{2+}$, $Mg^{2+}$, $Rb^{1+}$, $Na^{1+}$, $Tl^{3+}$, $Li^{1+}$, $Zn^{2+}$ or $Sn^{4+}$, and X is chloro, fluoro, or bromo.

22. Article according to claim 21, wherein $Me^{a+}$ is $Ag^{+1}$.

23. Article according to claim 21, said components of said system being in the proportion of a eutectic composition of a compound of $Me^{a+}$ and X and a compound of $Me^{b+}$ and X.

24. Article according to claim 18, wherein $Me^{a+}$ is $Ag^{1+}$, $Hg^{2+}$, or $Cd^{2+}$; X is chloro or bromo; and $Me^{b+}$ is $K^{1+}$, $Pb^{2+}$, or $Mg^{2+}$.

25. Article according to claim 18, said components of said system being in the proportion of a eutectic composition of a compound of $Me^{a+}$ and X and a compound of $Me^{b+}$ and X.

* * * * *

UNITED STATES PATENT AND TRADEMARK OFFICE
CERTIFICATE OF CORRECTION

PATENT NO. : 3,950,591
DATED : April 13, 1976
INVENTOR(S) : Dr. Georg Gliemeroth and Lothar Meckel It is certified that error appears in the above-identified patent and that said Letters Patent are hereby corrected as shown below:

Columns 7 and 8, Table 2, under Metal A, "12.18" should be --12.13--.

Column 14, line 7, (claim 13), change "9+ = b+" to --a+ = b+--.

Signed and Sealed this

Twenty-ninth Day of March 1977

[SEAL]

Attest:

RUTH C. MASON
*Attesting Officer*

C. MARSHALL DANN
*Commissioner of Patents and Trademarks*